US009845855B2

(12) United States Patent
Depraete

(10) Patent No.: US 9,845,855 B2
(45) Date of Patent: Dec. 19, 2017

(54) TORQUE CONVERTER AND HYDROKINETIC TORQUE COUPLING DEVICE HAVING TURBINE-PISTON LOCKUP CLUTCH WITH LOCKUP RESISTANCE MEMBER

(71) Applicant: VALEO EMBRAYAGES, Amiens (FR)

(72) Inventor: Alexandre Depraete, Bloomfield, MI (US)

(73) Assignee: Valeo Embrayages (FR)

(*) Notice: Subject to any disclaimer, the term of this patent is extended or adjusted under 35 U.S.C. 154(b) by 109 days.

(21) Appl. No.: 14/522,372

(22) Filed: Oct. 23, 2014

(65) Prior Publication Data
US 2016/0116041 A1 Apr. 28, 2016

(51) Int. Cl.
*F16H 45/02* (2006.01)
*F16H 45/00* (2006.01)

(52) U.S. Cl.
CPC ....... *F16H 45/02* (2013.01); *F16H 2045/007* (2013.01); *F16H 2045/0205* (2013.01); *F16H 2045/0226* (2013.01); *F16H 2045/0278* (2013.01)

(58) Field of Classification Search
None
See application file for complete search history.

(56) References Cited

U.S. PATENT DOCUMENTS

| 2,130,895 A | 9/1938 | Ness |
| 2,860,747 A | 11/1958 | Kelley |
| 2,992,713 A | 7/1961 | Stump et al. |

(Continued)

FOREIGN PATENT DOCUMENTS

| DE | 1550957 A1 | 7/1969 |
| DE | 2245901 A1 | 4/1974 |

(Continued)

OTHER PUBLICATIONS

Lindemann et al., "iTC—Innovative Solutions for Torque Converters Pave the Way into the Future", Torque Converter 20, pp. 280-301.

(Continued)

*Primary Examiner* — Colby M Hansen
(74) *Attorney, Agent, or Firm* — Berenato & White, LLC

(57) ABSTRACT

A torque converter includes an impeller, a turbine-piston hydrodynamically drivable by the impeller, and an annular lockup resistance member. The impeller includes an impeller shell. The turbine-piston includes a turbine-piston shell having a turbine-piston flange with a first flange surface facing an engagement surface of the impeller shell and an opposite second flange surface. The turbine-piston is movable axially toward and away from the engagement surface to position the torque converter into and out of a lockup mode in which the turbine-piston flange is mechanically locked to the impeller shell. The annular lockup resistance member is coaxially aligned with the rotational axis, fixedly connected and non-rotatable relative to the turbine-piston flange, and configured to resist axial movement of the turbine-piston flange toward the engagement surface and into lockup with the impeller shell.

20 Claims, 8 Drawing Sheets

(56) References Cited

U.S. PATENT DOCUMENTS

| | | |
|---|---|---|
| 3,041,892 A | 7/1962 | Schjolin |
| 3,252,352 A | 5/1966 | General et al. |
| 4,041,701 A | 8/1977 | Goto et al. |
| 5,713,442 A | 2/1998 | Murata et al. |
| 5,813,505 A | 9/1998 | Olsen et al. |
| 6,026,940 A | 2/2000 | Sudau |
| 6,053,292 A * | 4/2000 | Macdonald .......... F16H 45/02 192/3.28 |
| 6,915,886 B2 | 7/2005 | Dacho et al. |
| 7,191,879 B2 | 3/2007 | Arhab et al. |
| 7,445,099 B2 | 11/2008 | Maucher et al. |
| 8,276,723 B2 | 10/2012 | Verhoog et al. |
| 8,479,901 B2 | 7/2013 | Engelmann |
| 2003/0168298 A1 | 9/2003 | Holler et al. |
| 2003/0168299 A1 | 9/2003 | Holler et al. |
| 2004/0011032 A1 | 1/2004 | Holler et al. |
| 2006/0086584 A1 | 4/2006 | Maucher et al. |
| 2009/0020385 A1 | 1/2009 | Nakamura |
| 2009/0078522 A1* | 3/2009 | Jung .................. F16H 45/02 192/3.29 |
| 2010/0236228 A1 | 9/2010 | Degler |
| 2012/0241273 A1 | 9/2012 | Kawahara |
| 2013/0230385 A1 | 9/2013 | Lindemann et al. |
| 2014/0014454 A1 | 1/2014 | Davis |
| 2014/0014455 A1 | 1/2014 | Davis |
| 2014/0097055 A1 | 4/2014 | Lindemann et al. |
| 2014/0110207 A1 | 4/2014 | Davis |
| 2015/0362041 A1 | 12/2015 | Lee et al. |

FOREIGN PATENT DOCUMENTS

| | | |
|---|---|---|
| DE | 10226860 A1 | 12/2003 |
| EP | 0125428 A1 | 11/1984 |
| EP | 1744074 | 1/2007 |
| FR | 668839 A | 11/1929 |
| FR | 2317556 A1 | 2/1977 |
| FR | 2428188 A1 | 1/1980 |
| FR | 2561342 A1 | 9/1985 |
| FR | 2706967 A1 | 12/1994 |
| FR | 2736982 A1 | 1/1997 |
| FR | 2787854 A1 | 6/2000 |
| GB | 3B598811 | 2/1948 |
| JP | 58-131466 A | 8/1983 |
| KR | 101311531 B1 | 9/2013 |
| WO | WO2004018897 | 3/2004 |
| WO | 2004046574 A1 | 6/2004 |

OTHER PUBLICATIONS

U.S. Appl. No. 14/510,244, filed, Oct. 9, 2014, First Named Inventor: Alexandre Depraete.
U.S. Appl. No. 14/510,267, filed, Oct. 9, 2014, First Named Inventor: Alexandre Depraete.
U.S. Appl. No. 14/522,189, filed, Oct. 23, 2014, First Named Inventor: Alexandre Depraete.
U.S. Appl. No. 14/522,263, filed, Oct. 23, 2014, First Named Inventor: Alexandre Depraete.
U.S. Appl. No. 14/522,302, filed, Oct. 23, 2014, First Named Inventor: Alexandre Depraete.
U.S. Appl. No. 14/522,333, filed, Oct. 23, 2014, First Named Inventor: Alexandre Depraete.
U.S. Appl. No. 14/522,361, filed, Oct. 23, 2014, First Named Inventor: David Werthman.
U.S. Appl. No. 14/522,393, filed, Oct. 23, 2014, First Named Inventor: Alexandre Depraete.
U.S. Appl. No. 14/561,961, filed, Dec. 5, 2014, First Named Inventor: Alexandre Depraete.
U.S. Appl. No. 14/562,022, filed, Dec. 5, 2014, First Named Inventor: Alexandre Depraete.
U.S. Appl. No. 14/562,064, filed, Dec. 5, 2014, First Named Inventor: Alexandre Depraete.
U.S. Appl. No. 14/562,099, filed, Dec. 5, 2014, First Named Inventor: Alexandre Depraete.
U.S. Appl. No. 14/562,136, filed, Dec. 5, 2014, First Named Inventor: Alexandre Depraete.
U.S. Appl. No. 14/562,216, filed, Dec. 5, 2014, First Named Inventor: Sungchul Lee.
U.S. Appl. No. 14/562,253, filed, Dec. 5, 2014, First Named Inventor: Alexandre Depraete.
U.S. Appl. No. 14/562,286, filed, Dec. 5, 2014, First Named Inventor: Alexandre Depraete.
U.S. Appl. No. 14/687,602, filed, Apr. 15, 2015, First Named Inventor: Alexandre Depraete.
Machine Translation of EP 0125428 downloaded from EPO.org on Jul. 22, 2016.

* cited by examiner

TORQUE CONVERTER AND HYDROKINETIC TORQUE COUPLING DEVICE HAVING TURBINE-PISTON LOCKUP CLUTCH WITH LOCKUP RESISTANCE MEMBER

BACKGROUND OF THE INVENTION

1. Field of the Invention

The present invention generally relates to torque converters and hydrokinetic torque coupling devices, and more particularly to torque converters and hydrokinetic torque coupling devices including turbine-piston lockup clutches for mechanically coupling driving and driven shafts.

2. Description of the Related Art

Generally, vehicles with automatic transmissions are equipped with a hydrokinetic torque coupling device for fluidly coupling the driving shaft of an engine to a driven shaft of a transmission. Lockup clutches are known for mechanically coupling the driving and driven shafts under certain operating conditions. Lockup clutches and their operation are described in, for example, U.S. Pat. No. 8,276,723 and U.S. Pat. No. 7,191,879.

While hydrokinetic torque coupling devices with lockup clutches have proven to be useful for vehicular driveline applications and conditions, improvements that may enhance their performance and cost are possible.

As taught hereinbelow, such improvements may derive from, for example, reducing the spatial requirements of components of the hydrokinetic torque coupling device and/or consolidating functions of two or more components into a single component.

BRIEF SUMMARY OF THE INVENTION

According to a first aspect of the invention, there is provided a torque converter including at least an impeller rotatable about a rotational axis and having a first engagement surface, a turbine-piston coaxially aligned with and hydrodynamically drivable by the impeller, and an annular lockup resistance member. The impeller includes an impeller shell. The turbine-piston includes a turbine-piston shell having a turbine-piston flange with a first flange surface facing the engagement surface and an opposite second flange surface. The turbine-piston is movable axially toward and away from the engagement surface to position the torque converter into and out of a lockup mode in which the turbine-piston flange is mechanically locked with the impeller shell so as to be non-rotatable relative to the impeller shell. The annular lockup resistance member is coaxially aligned with the rotational axis, fixedly connected to and non-rotatable relative to the turbine-piston flange, and configured to resist axial movement of the turbine-piston flange toward the engagement surface and into lockup with the impeller shell.

According to a second aspect of the invention, there is provided a hydrokinetic torque coupling device for coupling together a driving shaft and a driven shaft. The hydrokinetic torque coupling device of this second aspect includes a casing and a torque converter. The casing includes an impeller shell connected to and non-rotatable relative to the impeller shell, the casing having an engagement surface. The torque converter includes an impeller, a turbine-piston hydrodynamically drivable by the impeller, and an annular lockup resistance member. The impeller includes the impeller shell. The turbine-piston includes a turbine-piston shell having a turbine-piston flange with a first flange surface facing the engagement surface of the casing and an opposite second flange surface. The turbine-piston is movable axially toward and away from the engagement surface to position the hydrokinetic torque coupling device into and out of a lockup mode in which the turbine-piston flange is mechanically locked with the casing so as to be non-rotatable relative to the casing. The annular lockup resistance member is fixedly connected and non-rotatable relative to the turbine-piston flange and is configured to resist axial movement of the turbine-piston flange toward the engagement surface and into lockup with the casing.

A third aspect of the invention provides a method of assembling the hydrokinetic torque coupling device for coupling a driving shaft and a driven shaft together. The method involves providing a torque converter rotatable about a rotational axis, the torque converter including an impeller, a turbine-piston hydrodynamically drivable by the impeller, and an annular lockup resistance member. The impeller includes an impeller shell, and has an engagement surface. The turbine-piston includes a turbine-piston shell having a turbine-piston flange with a first flange surface facing the engagement surface and an opposite second flange surface. The turbine-piston is movable axially toward and away from the engagement surface to position the torque converter into and out of a lockup mode in which the turbine-piston flange is mechanically locked with the impeller shell so as to be non-rotatable relative to the impeller shell. The annular lockup resistance member is coaxially aligned with the rotational axis, fixedly connected and non-rotatable relative to the turbine-piston flange, and configured to resist axial movement of the turbine-piston flange toward the engagement surface and into lockup with the impeller shell. According to the method, a casing shell is operatively connected to the impeller shell to form a casing that is rotatable about the rotational axis.

Other aspects of the invention, including apparatus, devices, systems, coupling devices, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein.

Figure 1:
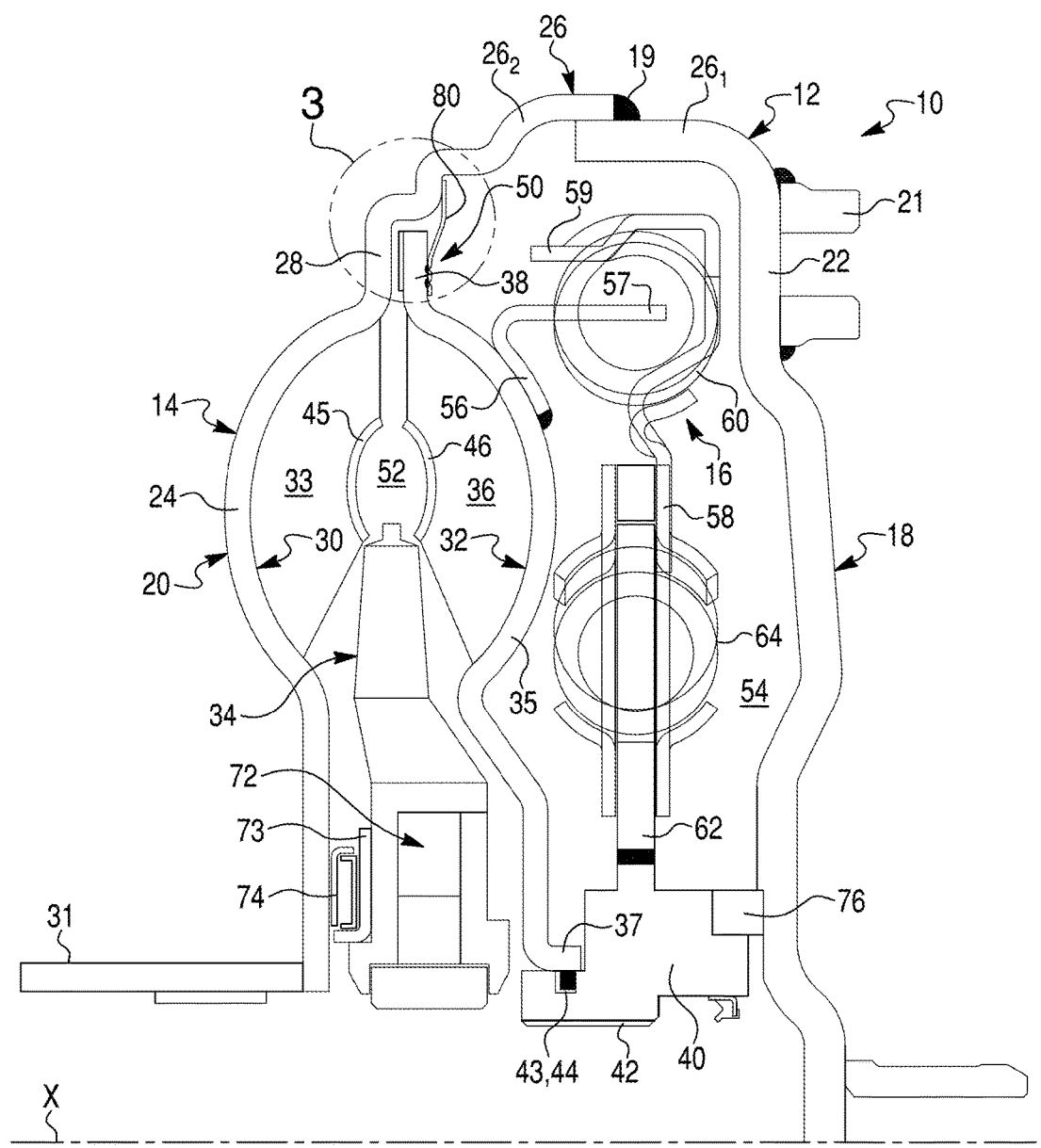
FIG. 1 is a fragmented half-view in axial section of a hydrokinetic torque coupling device equipped with a turbine-piston in accordance with a first exemplary embodiment of the present invention.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper," "lower," "right," "left," "top," and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the words "a" and "an" as used in the claims mean "at least one."

Figure 2:
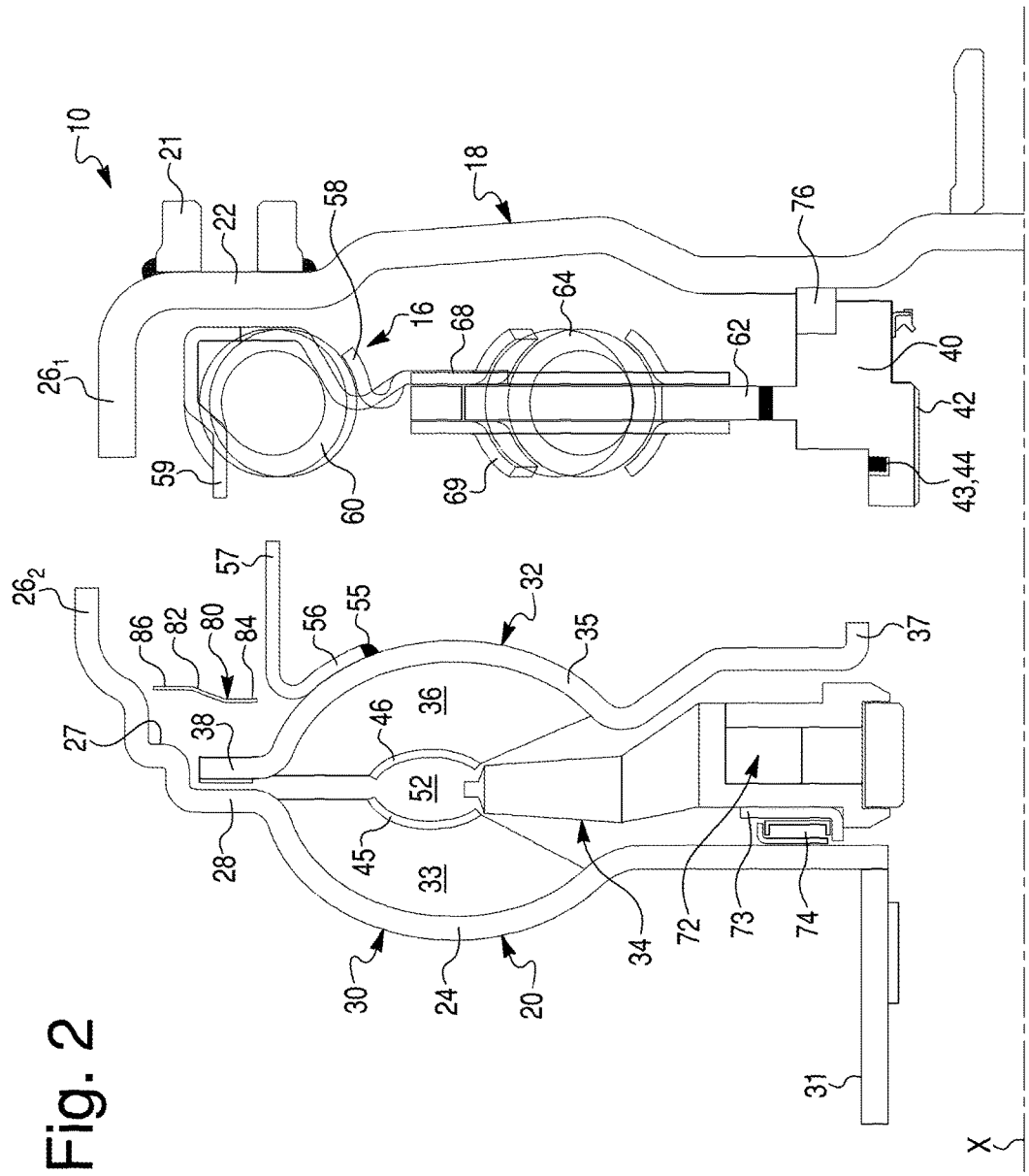
FIG. 2 is an exploded fragmentary cross-sectional view of the hydrokinetic torque coupling device of FIG. 1.

A first exemplary embodiment of a hydrokinetic torque coupling device is generally represented in FIGS. 1 and 2 by reference numeral 10. The hydrokinetic torque coupling device 10 is operable to fluidly or mechanically couple a driving shaft and a driven shaft of a motor vehicle, such as an automobile. In the typical case, the driving shaft is an output shaft of an internal combustion engine (not shown) of the motor vehicle and the driven shaft is connected to an automatic transmission of the motor vehicle.

The hydrokinetic torque coupling device 10 includes a sealed casing 12 filled with a fluid, such as oil or transmission fluid. The sealed casing 12, a hydrodynamic torque converter 14 and a torsional vibration damper (also referred to herein as a damper assembly) 16 are all rotatable about a rotational axis X. The drawings discussed herein show half-views, that is, the portion or fragment of the hydrokinetic torque coupling device 10 above rotational axis X. Generally, the device 10 is symmetrical about the rotational axis X. Herein, the axial and radial orientations are considered with respect to the rotational axis X of the torque coupling device 10. The relative terms such as "axially," "radially," and "circumferentially" are with respect to orientations parallel to, perpendicular to, and circularly around the rotational axis X, respectively.

The sealed casing 12 according to the first exemplary embodiment as illustrated in FIG. 1 includes a first casing shell 18 and a second casing shell 20 fixedly connected sealingly together, such as by welding at weld 19 at their outer peripheries, so as to be non-movable relative to one another. The first casing shell 18 is fixedly interconnected to the driving shaft, more typically a flywheel (not shown) that is fixed to so as to be non-rotatable relative to the driving shaft, so that the casing 12 turns at the same speed that the engine operates for transmitting torque. Specifically, in the illustrated embodiment of FIG. 1 the casing 12 is rotatably driven by the internal combustion engine and is non-rotatably coupled to the flywheel thereof with studs 21, shown in FIG. 1. Each of the first and second casing shells 18, 20 may be made, for example, integrally by press-forming one-piece metal sheets.

The first casing shell 18 includes a first sidewall 22 extending substantially radially relative to the direction from the rotational axis X (i.e., in a plane that is generally transverse to the rotational axis X) and a cylindrical first outer wall portion $26_1$ extending substantially axially from the first sidewall 22 toward the second casing shell 20. Similarly, the second casing shell 20 includes a second sidewall 24 extending substantially radially relative to the direction from the rotational axis X and a cylindrical second outer wall portion $26_2$ extending substantially axially from the second sidewall 24 toward the first casing shell 18. The second sidewall 24 includes an integral piston engagement portion 28 having an engagement surface 29, best shown in FIGS. 2 and 3. The piston engagement portion 28 is embodied as integral with the second sidewall 24 of the second casing shell 20, e.g., made of a single or unitary component. The first and second outer wall portions $26_1$, $26_2$ collectively establish an annular outer wall 26 substantially parallel with the rotation axis X. The weld 19 fixedly secures the outer wall portions $26_1$ and $26_2$ together.

The torque converter 14 includes an impeller (sometimes referred to as the pump or impeller wheel) 30, a turbine-piston 32, and a stator (sometimes referred to as the reactor) 34 interposed axially between the impeller 30 and the turbine-piston 32. The impeller 30, the turbine-piston 32, and the stator 34 are coaxially aligned with one another on the rotational axis X. The impeller 30, the turbine-piston 32, and the stator 34 collectively form a torus. The impeller 30 and the turbine-piston 32 may be fluidly (or hydrodynamically) coupled to one another as known in the art.

The second casing shell 20 of the casing 12 also forms and serves as the impeller shell of the impeller 30. Accordingly, the impeller shell 20 sometimes is referred to as pan of the casing 12. The impeller 30 further includes a core ring 45, and a plurality of impeller blades 33 fixedly attached, such as by brazing, to the impeller shell 20 and the core ring 45. The impeller 30, including the impeller shell 20, the core ring 45, and the blades 33, is fixedly secured to the first casing shell 18 so as to be non-rotatable relative to the first casing shell 18 and hence to the drive shaft (or flywheel) of the engine so that the impeller 30 rotates at the same speed as the engine output. The impeller 30 also includes an impeller hub 31 fixedly secured to the impeller shell 20. The impeller hub 31 is arranged for engagement with a hydraulic pump of the transmission.

The hydrokinetic torque coupling device 10 further includes an output hub 40 that is rotatable about the rotational axis X. The output hub 40 is operatively coupled to and coaxial with the driven shaft. For example, the output hub 40 may be provided with internal splines 42 for non-rotatably coupling the output hub 40 to the driven shaft, such as a transmission input shaft, provided with complementary external splines. Alternatively, a weld or other connection may be used to fix the output hub 40 to the driven shaft. A radially outer surface of the output hub 40 includes an annular slot 43 for receiving a sealing member, such as an O-ring 44.

The turbine-piston 32 is a consolidation or incorporation of a turbine with a lockup clutch piston. The turbine component of the turbine-piston 32 includes a turbine-piston shell 35, a core ring 46, and a plurality of turbine blades 36 fixedly attached, such as by brazing, to the turbine-piston shell 35 and the core ring 46. The spinning of the impeller 30 causes transmission fluid in the torus to spin the turbine blades 36, and hence the turbine-piston shell 35. The impeller shell 20 and the turbine-piston shell 35 collectively define a substantially toroidal first chamber (or torus chamber) 52 therebetween. Referring to FIG. 1, the torus chamber 52 is to the left side of the turbine-piston shell 35, and a second (or damper) chamber 54 is to the other (right) side of the turbine-piston shell 35. In other words, the first chamber 52 is defined between the impeller shell 20 and the turbine-piston shell 35, while the second chamber 54 is defined between the turbine-piston shell 35 and the first casing shell 18.

Returning to FIG. 1, the stator 34 is positioned between the impeller 30 and the turbine-piston 32 to redirect fluid from the turbine-piston 32 back to the impeller 30 in an efficient manner. The stator 34 is typically mounted on a one-way clutch 72 to prevent the stator 34 from counter-rotation. A thrust bearing 74 is interposed between a side bearing ring 73, mounted to a side of the stator 34, and the impeller shell 20 of the casing 12.

Extending axially at a radially inner peripheral end of the turbine-piston shell 35 is a substantially cylindrical flange 37 that is proximate to the rotational axis. The substantially cylindrical flange 37 of the turbine-piston 32 is rotatable relative to the output hub 40. The sealing member O-ring) 44 creates a seal at the interface of the substantially cylindrical flange 37 and the output hub 40. As discussed in further detail below, the turbine-piston 32 is axially movably relative to the output hub 40 along this interface.

The piston component of the turbine-piston 32 includes a substantially annular, planar (i.e., flat) turbine-piston flange (or turbine-piston wall) 38. The turbine-piston flange 38 is distal to the rotational axis X relative to the above-discussed proximal flange 37. The turbine-piston flange 38 is a radial extension of the turbine-piston shell 35 and, as illustrated in FIG. 1, is disposed radially outside of the turbine blades 36. The turbine-piston flange 38 and the turbine-piston shell 35 are embodied as integral with one another, e.g., made of a single or unitary component, but may be separate components non-moveably connected together. The turbine-piston flange 38 extends from a radially outer peripheral end of the turbine-piston shell 35 radially outward, transverse to rotational axis X, to terminate at an end in spaced relationship to the inner peripheral surface of the annular outer wall portion $26_2$ of the casing 12. The turbine-piston flange 38 extends sufficiently outward radially to axially overlap with the piston engagement portion 28 of the second casing shell 20.

Figure 3:
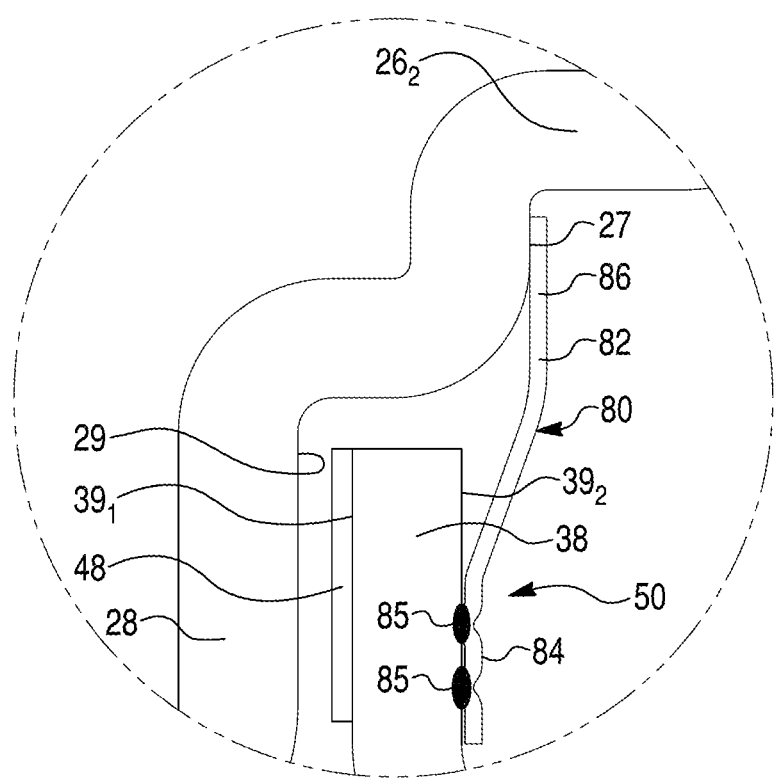
FIG. 3 is an enlarged front view of a fragment of the turbine-piston shown in the circle "3" of FIG. 1.

As best shown in FIGS. 2 and 3, the turbine-piston flange 38 has two axially opposite planar surfaces: a first flange surface $39_1$ facing the piston engagement portion 28 of the second casing shell 20, and a second flange surface $39_2$ facing the first sidewall 22 of the casing 12. The engagement surface 29 and the first flange surface 39 are parallel to and face one another, and extend radially at a 90 degree angle relative to the rotational axis X. The first flange surface $39_1$ faces and, as explained below, is movable axially toward and away from the engagement surface 29 of the casing 12 to position the turbine-piston flange 38 of the turbine-piston 32 respectively into and out of a lockup position, or, in other words, to position the torque coupling device 10 into and out of a lockup mode, respectively. The turbine-piston flange 38 of the turbine-piston 32 and the piston engagement portion 28 of the casing 12 together create a lockup clutch 50 that bypasses the hydrodynamic fluid coupling of the torque converter 14 and mechanically couples the driving and driven shafts.

In accordance with the first exemplary embodiment, the first flange surface $39_1$ of the turbine-piston flange 38 is provided with a friction ring (or friction lining) 48, best shown in 3, which shows the lockup clutch 50 in a non-lockup mode. The friction ring 48 may be secured to the first flange surface $39_1$, for example, by adhesive bonding and/or with fasteners. The friction ring 48 is made of a friction material for improved frictional performance. Alternatively, a friction ring (or friction lining) may be secured to the engagement surface 29. According to still another embodiment, a first friction ring or liner is secured to the engagement surface 29 of the casing 12 and a second friction ring or liner is secured to the first flange surface $39_1$. It is within the scope of the invention to omit one or both of the friction rings.

Depending, on conditions, when the torque converter 14 transmits the movement hydro-dynamically. Simultaneously, the action of the transmission fluid generates an axial force which moves the turbine-piston 32 toward the impeller 30 and into the lockup mode. This axial force varies depending on the speed, torque, drive, and coast. Under some stable or transient conditions, the axial force may axially displace the turbine-piston 32 into contact with the impeller 30 and close the lockup clutch 50 in unexpected circumstances, i.e., when hydrodynamic transmission mode is desired.

In order to avoid these situations, the torque coupling device 10 further includes an annular lockup resistance member 80 coaxially aligned with the rotational axis X and fixedly connected and non-rotatable relative to the turbine-piston flange 38 to resist axial movement of the turbine-piston flange 38 toward the engagement surface 29 and into lockup with the impeller shell 20. The annular lockup member 80 especially resists unintended lockup at lower speed ratios. In certain embodiments, the annular lockup resistance member 80 is selected so as not to bias (or urge) the turbine-piston 32 away from the impeller 30 when no axial thrust force is applied to the turbine-piston 32 in the direction toward the impeller 30.

The annular lockup resistance member 80 is rotatable relative to at least one of the casing 12 and the turbine-piston 32. In the first exemplary embodiment of the present invention illustrated in FIGS. 1-3, the annular thrust resistance member 80 is embodied as an annular spring washer 82, such as, for example, a Belleville washer or a diaphragm spring, coaxial with the rotational axis X. i.e., centered in the impeller shell 20. Alternatively, the thrust resistance member 80 can be embodied as two or more annular spring washers 82, each coaxial with the rotational axis X. The spring washer 82 has a radially inner end portion 84 and a radially outer end portion 86. The radially inner end portion 84 is non-movably (i.e., fixedly) connected to the second flange surface $39_2$, such as by resistance or spot welding at 85, as best shown in FIG. 3. The radially outer end portion 86 circumferentially slidingly engages an axially inner peripheral surface 27 of the impeller shell 20 radially outside of the turbine-piston flange 38 (best shown in FIGS. 2 and 3). This sliding engagement by the radially outer end portion 86 of the spring washer 82 relative to the casing 12 allows the spring washer 82 to rotate relative to the casing 12 when the lockup clutch 50 of the torque coupling device 10 is in non-lockup (hydrodynamic transmission) mode. Anti-friction material may be situated at the interface of the spring washer 82 and the casing 12.

The lockup resistance member 80 resists the axial thrust load created by the hydrodynamic forces of the torque inverter 14 during the non-lockup mode, thus keeping the lockup clutch 50 disengaged until proper speed ratio between the turbine-piston 32 and the impeller 30 is achieved. However, the lockup resistance member 80 may be configured to apply no force that biases (or urges) the turbine-piston 32 away from the impeller 30 when no axial thrust force is generated in the hydrodynamic transmission mode.

In the lockup mode, the engagement surface 29 and the first piston surface $39_1$ (or friction ring(s) 48 secured thereto) are pressed together such that the turbine-piston flange 38 of the turbine-piston 32 is frictionally non-rotatably coupled to the piston engagement portion 28 of the casing 12, thereby mechanically locking the turbine-piston 32 to the casing 12. When not in the lockup mode, i.e., in the hydrodynamic transmission mode, the engagement surface 29 and the first flange surface $39_1$ are spaced from one another, such that the turbine-piston flange 38 is not frictionally non-rotatably coupled to the casing 12. In the non-lockup mode, normal operation of the torque converter 14 hydrodynamically couples and decouples the impeller 30 to and from the turbine-piston 32.

The torsional vibration damper 16 is housed in the casing 12 axially between the turbine-piston 32 and the first sidewall 22 of the casing 12, as shown in FIG. 1. The torsional vibration damper 16 is connected to a drive (or input) member 56 (discussed below), and includes a plurality of first (or radially outer) circumferential elastic, damping members 60, an intermediate member 58 drivenly coupled to the drive member 56 through the first circumferential damping members 60, a plurality of second (or radially inner) circumferential elastic damping members 64, and a driven (or output) member 62 drivenly coupled to the intermediate member 58 through the second circumferential damping members 64. The first circumferential damping members 60 are situated radially outward from the second circumferential damping members 64. According to the exemplary embodiment of FIG. 1, the first and second damping members 60, 64 are configured as helical (or coil) springs having principal axes oriented substantially circumferentially. Other elastic members may be selected to replace or supplement the springs.

The drive member 56 is fixedly connected to the turbine-piston shell 35 of the turbine-piston 32, such as by weld 55. The output side of the drive member 56 has a plurality of driving (or drive) tabs 57 (FIG. 2) extending axially in the direction away from the turbine-piston 32. The driving tabs 57 of the drive member 56 are circumferentially equidistantly spaced from one another, and engage first circumferential ends of the first damping members 60.

The intermediate member 58 has a plurality of driven tabs 59 extending axially in an opposite direction to the driving tabs 57 of the drive member 56. The driven tabs 59 of the intermediate member 58 are circumferentially equidistantly spaced from one another, and engage the opposite second circumferential ends of the first damping members 60 than the driving tabs 57. The intermediate member 58 of the damper assembly 16 is rotatable relative to the drive member 56 and its driving tabs 57 due to elasticity of the first damping members 60, which absorb torsional vibration.

Additionally, the driving tabs 57 of the drive member 56 are axially movable relative to the driven tabs 59 of the intermediate member 58. This relative axial movement between the driving tabs 57 and the driven tabs 59 may become necessary during axial movement of the turbine-piston 32 between its lockup and non-lockup modes. As discussed in greater detail below, when the turbine-piston shell 35 shifts axially due to a lockup event, the driving tabs 57 move axially relative to the driven tabs 59. Thus, the drive member 56 is both axially and circumferentially moveable relative to the intermediate member 58, and generally to the damping assembly 16.

The radially inner portion of the intermediate member 58 forms or is connected to a first disk part 68 on a first side of the second damping members 64. The first disk part 68 is non-moveably secured to a second disk part 69 on the opposite side of the second damping members 64, such as by rivets or welding. The first and second disk parts 68, 69 establish an input part to the second damping members 64.

The driven member 62 establishes an output part of the second damping members 64. The driven member 62 has windows in which the second damping members 64 are set. The disk parts 68, 69 engage first ends of the second damping members 64, and the driven member 62 engages second ends of the second damping members 64. The disk parts 68, 69 of the intermediate member 58 are thus rotatable relative to the driven member 62, with the second damping members 64 absorbing torsional vibration due to their elasticity.

The driven member 62 is non-rotatably connected, e.g., fixed, to the output hub 40. The non-rotatable connection between the driven member 62 and the output hub 40 may be formed by splines or welding. Alternatively, the output hub 40 and driven member 62 may be integrally formed as a single piece. A thrust bearing 76 is positioned between the output hub 40 and the first casing shell 18.

As discussed above, the turbine-piston 32 is axially movable toward and away from the impeller shell 20 between a lockup position and a non-lockup (open) position. Axial movement of the turbine-piston 32 is accomplished by changing the pressure differential between the opposite sides of the turbine-piston shell 35, taking into account the spring stiffness force of the annular lockup resistance member 80. A pressure increase in the damper chamber 54 relative to the torus chamber 52 (or stated differently a pressure decrease in the torus chamber 52 relative to the damper chamber 54) that is greater than the spring stiffness force of the spring washer 82 of the annular lockup resistance member 80 shifts the turbine-piston shell 35 axially in the direction of torque transmission, i.e., towards the output side of the casing 12, that is right to left in FIG. 1, into the lockup mode. On the other hand, a pressure decrease in the damper chamber 54 relative to the torus chamber 52 (or stated differently a pressure increase in the torus chamber 52 relative to the damper chamber 54) acts with the spring stiffness force of the spring washer 82 to shift the turbine-piston shell 35 and the turbine-piston flange 38 axially against the direction of torque transmission, i.e., towards the input side of the casing, that is left to right in FIG. 1, out of the lockup mode. Pressure changes are created by control of the fluid, e.g., hydraulic fluid or oil, in the chambers 52 and 54.

In the lockup mode, the turbine-piston shell 35 is displaced axially towards the impeller 30 until the frictional ring 48 of the first flange surface $39_1$ of the turbine-piston flange 38 (which moves axially with the turbine-piston shell 35) abuts against and is non-rotatably frictionally coupled to the engagement surface 29 of the casing 12. In the lockup mode, torque is transferred from the engine to the casing 12, then by way of the frictional engagement between surfaces 29 and $39_1$ (or the frictional lining 48 thereof) through the turbine piston shell 35 to the drive member 56 welded thereto, then serially to the damping assembly 16 and the output hub 40.

As the turbine-piston 32 and the drive member 56 move axially into the lockup position as described above, the driving tabs 57 of the drive member 56 are axially displaced relative to the driven tabs 59 of the intermediate member 58. The relative axial movement of the driving tabs 57 relative to the driven tabs 59 allows the intermediate member 58, the driven member 62, and the damping members 60, 64 to remain fixed axially on the output hub 40 while the turbine-piston 32 and the drive member 56 move in the axial direction. Notably, the friction ring 48 secured to the second engagement surface $39_2$ may have a plurality of circumferentially spaced grooves (not shown) extending generally radially so as to fluidly connect the torus chamber 52 and the damper chamber 54 with one another in the lockup mode for cooling friction surfaces of the lockup dwelt 50 by the working fluid.

In the non-lockup mode, the turbine-piston 32 is displaced axially away from the impeller 30, axially moving the turbine-piston shell 35 and the turbine-piston flange 38 until the first flange surface $39_1$ (that is, the frictional lining 48 thereof) is spaced from and no longer non-rotatably frictionally coupled to the engagement surface 29. Thus, torque is transferred from the engine to the casing 12 in a hydrodynamic transmission mode that does not bypass the torque converter 14 through the lockup clutch 50. Driving tabs 57 move axially towards the driven tabs 59 as the lockup clutch 50 is moved from lockup to non-lockup mode. Notably, in the non-lockup mode an open fluid passage is established between the engagement surface 29 of the casing 12 and the first flange surface $39_1$. Hydraulic fluid is free to flow between the torus chamber 52 and the damper chamber 54 through the passage.

In operation, the lockup clutch 50 is generally activated after the hydraulic (hydrodynamic) coupling of the driving and driven shafts, typically at relatively constant speeds, order to avoid the loss of efficiency caused in particular by slip phenomena by between the turbine-piston 32 and the impeller 30. Because of the axial pressures acting on the turbine-piston 32 for movement between its lockup and non-lockup positions, the turbine-piston shell 35 may be made somewhat thicker than typical turbine shells that do not form or function as the lockup piston.

The turbine-piston 32 both forms the shell component of the turbine and the piston component of the lockup clutch 50, as described above. By consolidating two components that are normally separate from one another into a single component, space is saved in the hydrokinetic torque coupling device 10. This space-saving structure provides several design options. For example, the hydrokinetic torque coupling device 10 can be made smaller and lighter. Alternatively, the free space within the casing 12 can be used to add additional components, such as damping components.

Figure 4:
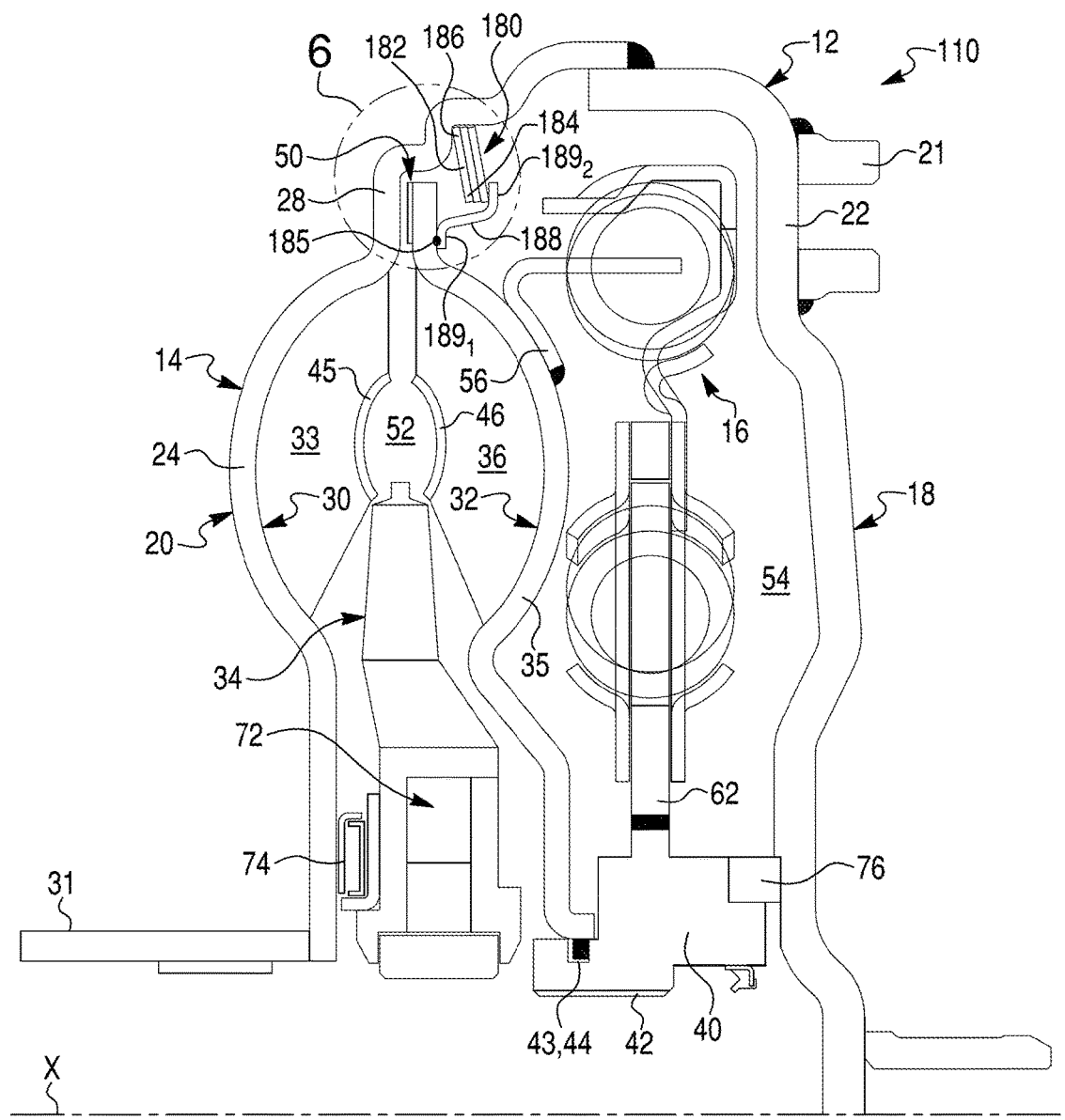
FIG. 4 is a fragmented half-view in axial section of a hydrokinetic torque coupling device equipped with a turbine-piston in accordance with a second exemplary embodiment of the present invention.
Figure 5:
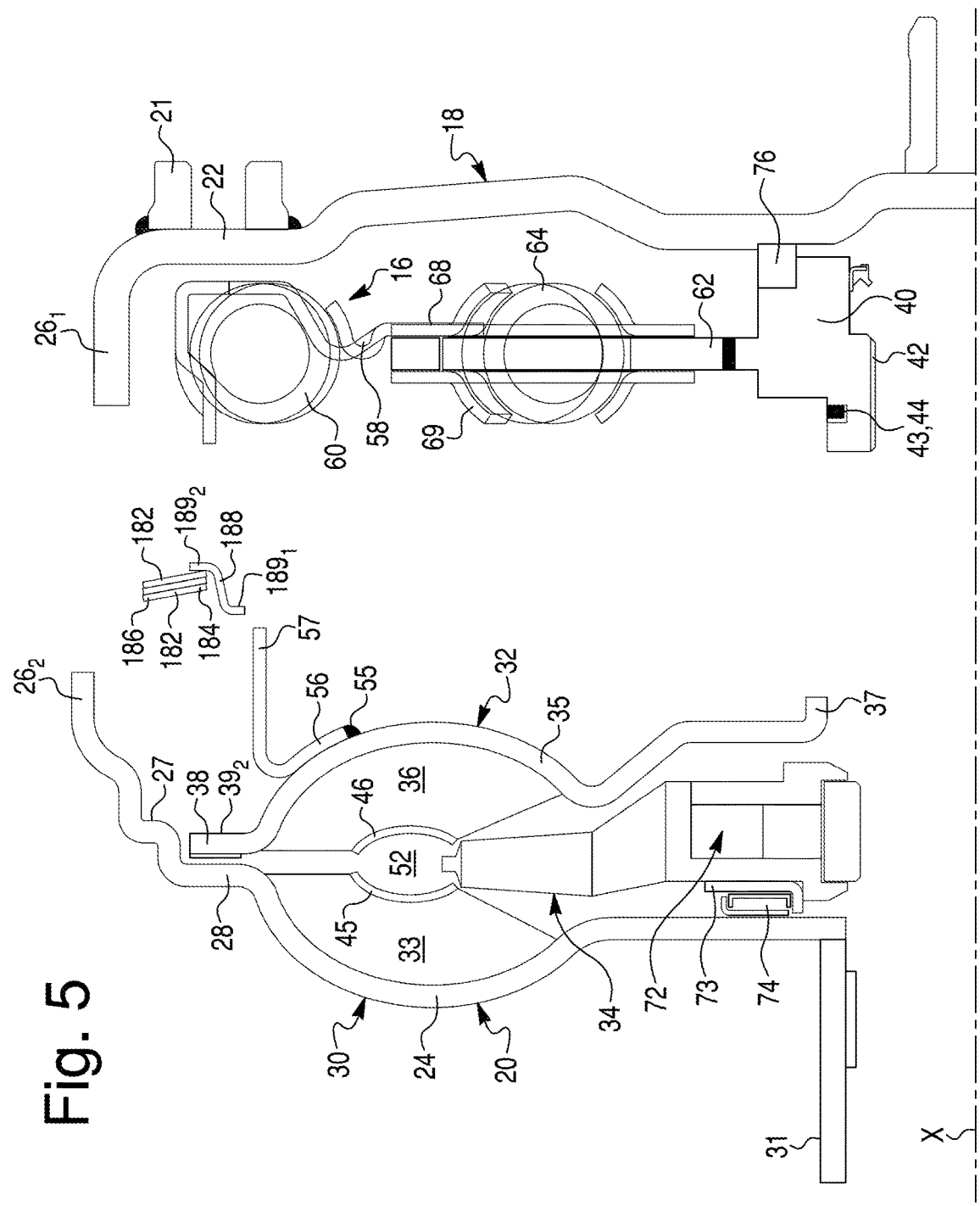
FIG. 5 is an exploded fragmentary cross-sectional view of the hydrokinetic torque coupling device of FIG. 4.
Figure 6:
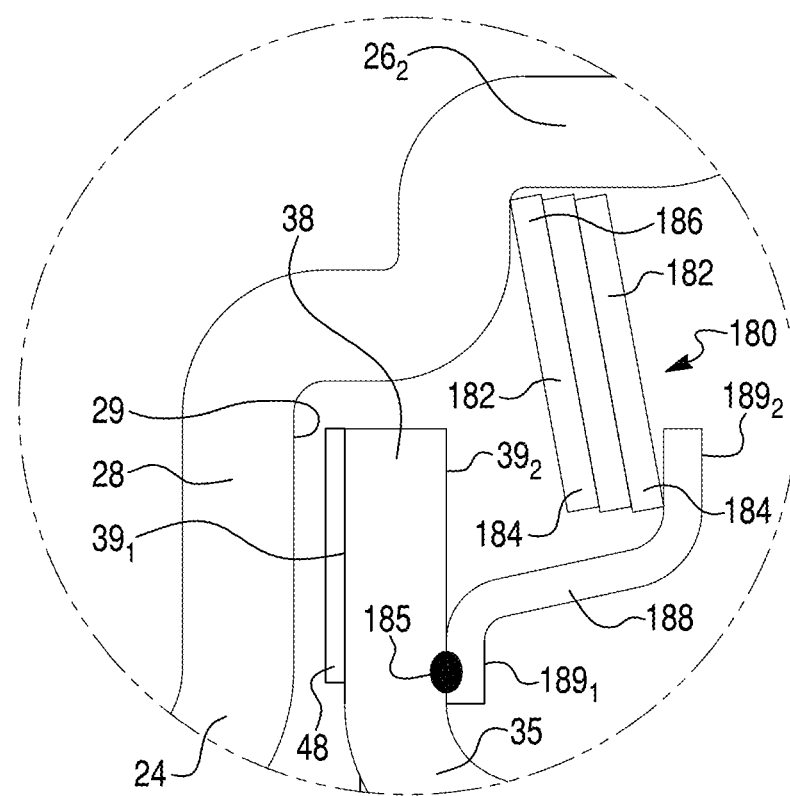
FIG. 6 is an enlarged front view of a fragment of the turbine-piston shown in the circle "6" of FIG. 4.

Various modifications, changes, and alterations may be practiced with the above-described embodiment, including, but not limited to the additional embodiments shown in FIGS. 4-6. In the interest of brevity, reference characters in FIGS. 4-6 that are discussed above in connection with FIGS. 1-3 are not further elaborated upon below, except to the extent necessary or useful to explain the additional embodiments of FIGS. 4-6. Modified components and parts are indicated by the addition of a hundred digits to the reference numerals of the components or parts.

In a hydrokinetic torque coupling device 110 of a second exemplary embodiment illustrated in FIGS. 4-6, the annular lockup resistance member 80 is replaced by an annular lockup resistance member 180. In the second exemplary embodiment of the present invention illustrated in FIGS. 4-6, the annular lockup resistance member 180 includes one or more annular spring washers 182, such as, for example, Belleville washers, and an annular retaining member 188 axially retaining the spring washers 182 relative to the turbine-piston 32. The spring washers 182 and the retaining member 188 are coaxial with the rotational axis X, i.e., centered in the impeller shell 20. The retaining member 188 has a radially inner end portion $189_1$ and a radially outer end portion $189_2$. The radially inner end portion $189_1$ is non-movably (i.e., fixedly) connected to the turbine-piston 32, for example, to the second surface $39_2$ of the turbine-piston flange 38 of the turbine-piston 32, such as by resistance or spot welding at 185, as best shown in FIG. 6. The radially outer end portion $189_2$ is in the form of an annular flange extending generally radially outwardly away from the rotational axis X (best shown in FIG. 5).

Each of the spring washer(s) 182 has a radially inner end portion 184 and a radially outer end portion 186. The radially inner end portions 184 of the spring washers 182 are axially retained relative to the turbine-piston 32 by the radially outer end portion $189_2$ of the retaining member 188.

The radially outer end portions 186 of the spring washers 182 circumferentially slideably engage a radially-extending inner peripheral surface 27 of the second outer wall $26_2$ of the casing 12 radially outside of the turbine-piston flange 38 (best shown in FIGS. 5 and 6). This sliding engagement by the radially outer end portions 186 of the spring washers 182 relative to the casing 12 allows the annular lockup resistance member 180 to rotate relative to the casing 12 when the lockup clutch 50 of the torque coupling device 10 is in non-lockup mode. Anti-friction material may be situated at the interface of the spring washers 182 and the inner peripheral surface 27. The purpose of the annular lockup resistance member 180 is to resist the axial thrust load generated by hydrodynamic transmission during the non-lockup mode, thus keeping the lockup clutch 50 disengaged until proper speed ratio between the turbine-piston 32 and the impeller 30 is achieved. However, the annular lockup resistance member 180 may be adapted to apply no force that biases (or urges) the turbine-piston 32 away from the impeller 30 when no axial thrust force is generated during the operation of the torque coupling device 110, i.e., so that no axial force is applied to the turbine-piston 32 in the direction toward the impeller 30.

Other variations and modifications include modifying the damper assembly 16 to include only damping members 60 or damping members 64, or to include additional damping members. The features of the above-described embodiments may be practiced with one another and are substitutable in numerous combinations.

An exemplary method for assembling, the hydrokinetic torque coupling device 10 according to the embodiment of FIGS. 1-3 will now be explained. It should be understood that this exemplary method may be practiced in connection with the other embodiments described herein. This exemplary method is not the exclusive method for assembling the hydrokinetic torque coupling devices described herein. While the methods for assembling the hydrokinetic torque coupling devices 10, 110 may be practiced by sequentially performing: the steps as set forth below, it should be understood that the methods may involve performing the steps in different sequences.

The impeller 30, the turbine-piston 32, the stator 34, and the damper assembly 16 may each be preassembled. The turbine-piston 32 includes, as noted above, the turbine-piston shell 35, the turbine-piston core ring 46, the turbine blades 36 extending between and attached to the turbine-piston shell 35 and the turbine-piston care 46, and the turbine-piston flange 38. The turbine-piston 32 is pre-assembled with the annular lockup resistance member 80/180. Specifically, the radially inner end portion 84 of the spring washer 82 is welded at the 85 (or otherwise fixedly connected) to the second surface $39_2$ of the turbine-piston flange 38 of the turbine-piston 32. Alternatively, the annular lockup resistance member 80/180 may be welded or otherwise fixed to the turbine-piston flange 38 after the torque converter 14 is assembled.

The impeller 30, the stator 34, and the turbine-piston 32 subassemblies are assembled together as shown in the drawings so that the radially outer end portion 86 of the spring washer 82 circumferentially slideably engages the axially inner peripheral surface 27 of the impeller shell 20 (best shown in FIGS. 2 and 3).

The cylindrical flange 37 of the turbine-piston 32 is mounted to slidingly engage the output hub 40 (which is splined with or mounted on the driven shaft) with the seal 44 therebetween. The damper assembly 16 is added. The driving tabs 57 are engaged with the damper assembly 16 as described above. Then, the first casing shell 18 is non-moveably and sealingly secured, such as by welding at 19, to the second casing shell 20, as best shown in FIG. 1.

Figure 7:
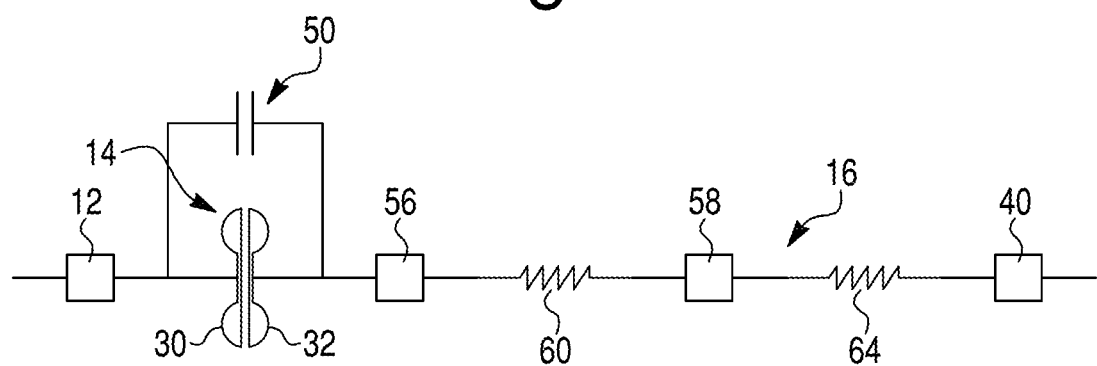
FIG. 7 is a simplified diagram of a hydrodynamic torque coupling device including a turbine-piston with a dual or double damper assembly.

The torque converters and hydrodynamic torque coupling, devices described herein may incorporate different damper assemblies. For example, FIG. 7 shows a hydrodynamic torque coupling device including the impeller 30 and the turbine-piston 32 for establishing the hydrodynamic transmission mode and the lockup clutch 50 for lockup mode transmission. The impeller 30/turbine-piston 32 combination and the lockup clutch 50 are arranged parallel to one another and serially between the casing 12 and the turbine-piston shell 35. The elastic damping members 60 and 64 of the damper assembly 16 and the output hub 40 are arranged serially downstream of the turbine-piston shell 35 in FIG. 7. The diagram of FIG. 7 generally corresponds to the arrangement of the embodiments shown in FIGS. 1-2 and 4-5.

Figure 8:
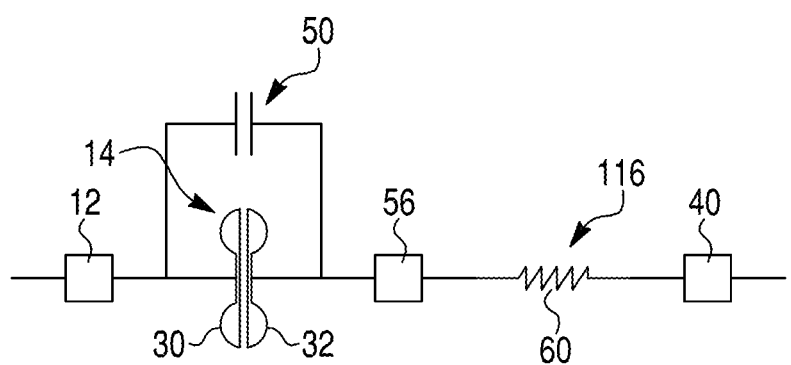
FIG. 8 is a simplified diagram of another hydrodynamic torque coupling device including a turbine-piston with a single damper assembly.

FIG. 8 shows an alternative damper assembly 116 similar to that of FIG. 7, but in which the damper assembly 16 is modified to include only one set of circumferentially extending elastic damping members 60.

Figure 9:
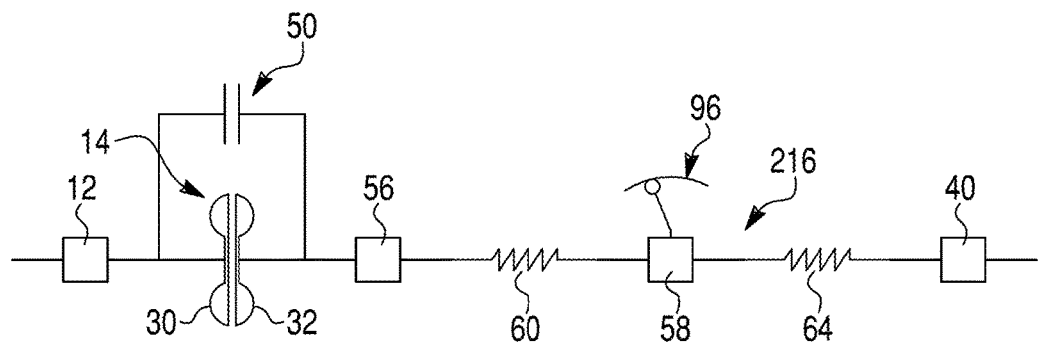
FIG. 9 is a simplified diagram of still another hydrodynamic torque coupling device including a turbine-piston with dual or double damper assemblies and a pendulum vibration absorber.

A damper assembly 216 shown in FIG. 9 is similar to that of FIG. 7, but further includes a centrifugal pendulum oscillator 96 coupled to the intermediate member 58. Centrifugal pendulum oscillators (or pendulum vibration absorbers) are well known in the art and described in, for example, U.S. patent application Ser. No. 14/305,128 filed Jun. 16, 2014. GB598811 to Stone, U.S. Pat. No. 6,026,940 to Sudau, and EP1744074 to Grahl. The centrifugal pendulum oscillator 96 may be coupled to the circumference of the intermediate member 58 and may be arranged on both sides of the intermediate member 58.

Figure 10:
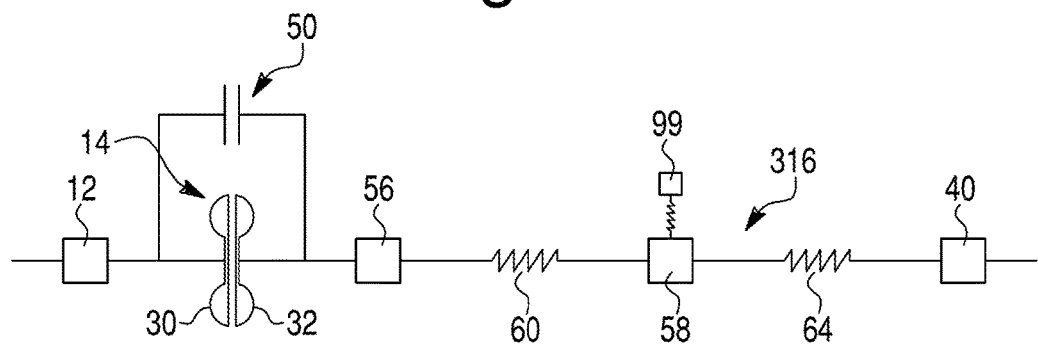
FIG. 10 is a simplified diagram of a further hydrodynamic torque coupling device including a turbine-piston with dual or double damper assemblies and a vibration absorbing spring-mass system.

A damper assembly 316 shown in FIG. 10 is similar to that of FIG. 7, but further includes a spring mass system 99 coupled to the intermediate member 58. Spring-mass systems are well known in the art and described in, for example, WO 2004/018897 to Haller. The spring-mass system 99 may be coupled to the circumference of the intermediate member 58. The spring of the spring-mass system 99 may be a coil spring, such as a steel spring. The damper may be any linear or non-linear damper, including for example a viscous damper. The spring and mass may be embodied as two components or one integral component. The spring-mass system may have a linear or non-linear constant or variable stiffness, and a constant or variable mass.

The features of the above-described embodiments are substitutable in numerous combinations.

The foregoing description of the exemplary embodiment (s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:
1. A torque converter comprising:
an impeller rotatable about a rotational axis and comprising an impeller shell having an engagement surface;
a turbine-piston coaxially aligned with and hydrodynamically drivable by the impeller, the turbine-piston comprising a turbine-piston shell including a turbine-piston flange having a first flange surface facing the engagement surface and an opposite second flange surface, the turbine-piston being movable axially toward and away from the engagement surface to position the torque converter into and out of a lockup mode in which the turbine-piston is mechanically locked to the impeller shell so as to be non-rotatable relative to the impeller shell; and
an annular lockup resistance member coaxially aligned with the rotational axis and fixedly connected to so as to be non-rotatable relative to the turbine-piston flange, and configured to resist axial movement of the turbine-piston flange toward the engagement surface and into lockup with the impeller shell.
2. The torque converter of claim 1, wherein the annular lockup resistance member has first end fixed to and non-rotatable relative to the second flange surface and a second end circumferentially slidingly engaging and rotatable relative to the impeller shell when the torque converter is out of the lockup mode.

3. The torque converter of claim 1, wherein the annular lockup resistance member has a radially inner portion fixed to and non-rotatable relative to the second flange surface and a radially outer portion circumferentially slidingly engaging and rotatable relative to the impeller shell when the torque converter is out of the lockup mode.

4. The torque converter of claim 3, wherein the radially outer portion of the annular lockup resistance member circumferentially slidingly engages and is rotatable relative to the impeller shell radially outside of the turbine-piston flange.

5. The torque converter of claim 1, wherein annular lockup resistance member is fixedly connected to and non-rotatable relative to the second flange surface.

6. The torque converter of claim 1, wherein the lockup resistance member comprises an annular spring washer coaxial with the rotational axis and an annular retaining member interconnecting the annular spring washer to the turbine-piston.

7. The torque converter of claim 6, wherein the annular spring washer has a radially inner end portion axially retained relative to the turbine-piston by the retaining member, and a radially outer end portion configured to circumferentially slidingly engage radially-extending inner peripheral surface of the impeller shell when the torque converter is out of the lockup mode.

8. The torque converter of claim 7, wherein the radially outer end portion of the annular spring washer is configured to circumferentially slidingly engage the radially-extending inner peripheral surface of the impeller shell radially outside of the turbine-piston flange when the torque converter is out of the lockup mode.

9. The torque converter of claim 7, wherein the retainer member has a radially inner end connected to and non-movable relative to the turbine-piston flange.

10. The torque converter of claim 1, wherein the lockup resistance member comprises a plurality of annular spring washers coaxial with the rotational axis and an annular retaining member interconnecting the spring washers to the turbine-piston.

11. The torque converter of claim 10, wherein the annular spring washers have radially outer end portions configured to circumferentially slidingly engage a radially-extending inner peripheral surface of the impeller shell when the torque converter is out of the lockup mode.

12. The torque converter of claim 11, wherein the radially outer end portions of the spring washers are configured to circumferentially slidingly engage the radially-extending inner peripheral surface of the impeller shell radially outside of the turbine-piston flange when the torque converter is out of the lockup mode.

13. The torque converter of claim 11, wherein the retainer member has a radially inner end connected to and non-movable relative to the turbine-piston flange.

14. A hydrokinetic torque coupling device for coupling together a driving shaft and a driven shaft, the hydrokinetic torque coupling device being rotatable about a rotational axis and comprising:
  a casing comprising an impeller shell and a casing shell connected to and non-rotatable relative to the impeller shell, the casing being rotatable about the rotational axis and having an engagement surface; and
  a torque converter coaxially aligned with and rotatable about the rotational axis, the torque converter comprising:
    an impeller comprising the impeller shell;
    a turbine-piston hydrodynamically drivable by the impeller and comprising a turbine-piston shell including a turbine-piston flange having a first flange surface facing the engagement surface and an opposite second flange surface, the turbine-piston shell being movable axially toward and away from the engagement surface to position the hydrokinetic torque coupling device into and out of a lockup mode in which the turbine-piston is mechanically locked to the casing so as to be non-rotatable relative to the casing; and
    an annular lockup resistance member coaxially aligned with the rotational axis and fixedly connected to so as to be non-rotatable relative to the turbine-piston flange to resist axial movement of the turbine-piston flange toward the engagement surface and into lockup with the casing.

15. The hydrokinetic torque coupling device of claim 14, further comprising: an output hub; and a torsional vibration damper interconnecting the turbine-piston and the output hub.

16. The hydrokinetic torque coupling device of claim 15, further comprising a drive member non-movably connected to the turbine-piston shell and connecting the turbine-piston shell to the torsional vibration damper, the torsional vibration damper further comprising a driven member operatively coupled to the output hub, and wherein the drive member is axially movable relative to the driven member of the torsional vibration damper.

17. The hydrokinetic torque coupling device of claim 15, further comprising a drive member interconnecting the turbine-piston shell to the torsional vibration damper, wherein the torsional vibration damper comprises an intermediate member, a first set of circumferentially extending elastic damping members drivingly coupling the drive member to the intermediate member, a driven member connected to and non-rotatable relative to the output hub, a second set of circumferentially extending elastic damping members drivingly coupling the intermediate member to the driven member, and a centrifugal pendulum oscillator mounted to the intermediate member.

18. The hydrokinetic torque coupling device of claim 15, further comprising a drive member interconnecting the turbine-piston shell to the torsional vibration damper, wherein the torsional vibration damper comprises an intermediate member, a first set of circumferentially extending elastic damping members drivingly coupling the drive member to the intermediate member, a driven member connected to and non-rotatable relative to the output hub, a second set of circumferentially extending elastic damping members drivingly coupling the intermediate member to the driven member, and a spring mass system coupled to the intermediate member.

19. The hydrokinetic torque coupling device of claim 14, wherein the turbine-piston shell and the turbine-piston flange are axially movable towards an output side of the hydrokinetic torque coupling device in order to frictionally couple the engagement surface and the first flange surface for positioning the turbine-piston in the lockup mode, and wherein the turbine-piston shell and the turbine-piston flange are axially movable towards an input side of the hydrokinetic torque coupling device so that the engagement surface and the first flange surface are not frictionally coupled and the turbine-piston is out of the lockup mode.

20. A method of assembling a hydrokinetic torque coupling device for coupling a driving shaft and a driven shaft together, comprising:
- providing a torque converter rotatable about a rotational axis, the torque converter comprising:
  - an impeller comprising the impeller shell having an engagement surface;
  - a turbine-piston hydrodynamically drivable by the impeller and comprising a turbine-piston shell comprising a turbine-piston flange having a first flange surface facing the engagement surface and an opposite second flange surface, the turbine-piston shell being movable axially toward and away from the engagement surface to position the torque converter into and out of a lockup mode in which the turbine-piston flange is mechanically locked to the impeller shell so as to be non-rotatable relative to the impeller shell; and
  - an annular lockup resistance member coaxially aligned with the rotational axis, fixedly connected to so as to be non-rotatable relative to the turbine-piston flange, and configured to resist axial movement of the turbine-piston flange toward the engagement surface and into lockup with the impeller shell; and
- operatively connecting a casing shell to the impeller shell of the torque converter to form a casing that is rotatable about the rotational axis.

* * * * *